United States Patent [19]
Kincaid et al.

[11] 3,729,078
[45] Apr. 24, 1973

[54] CLUTCH WITH CENTRIFUGALLY OPERATED CAMS

[76] Inventors: James R. Kincaid, 14717 Ziegler, Taylor, Mich. 48180; Clifford Kincaid, 1386 Arlington, Lincoln Park, Mich. 48146

[22] Filed: June 23, 1971

[21] Appl. No.: 156,006

[52] U.S. Cl. ........192/105 CP, 192/93 R, 192/107 R
[51] Int. Cl..............................................F16d 43/10
[58] Field of Search....................192/105 CP, 103 A, 192/93 R

[56] References Cited

UNITED STATES PATENTS

| | | | |
|---|---|---|---|
| 2,117,494 | 5/1938 | Neighbour | 192/105 CP X |
| 1,998,172 | 4/1935 | Ross | 192/105 CP X |
| 1,855,624 | 4/1932 | Chrstos | 192/105 CP |
| 1,438,614 | 12/1922 | Settlage | 192/105 CP |

FOREIGN PATENTS OR APPLICATIONS

| | | | |
|---|---|---|---|
| 652,978 | 9/1923 | France | 192/105 CP |

*Primary Examiner*—Benjamin W. Wyche
*Attorney*—Robert C. Hauke et al.

[57] ABSTRACT

An automatic clutch, engaged by centrifugal force, for coupling a driven shaft with a driving shaft above a predetermined rotational velocity of the driving shaft, and comprising a pair of spaced apart plates, one of which is mounted on the driving shaft, a disc disposed between the plates and connected to the driven shaft, and a pair of annular friction elements disposed one between a plate and the disc and the other between the disc and the other plate. The two plates are interconnected by means of a pair of longitudinally extending studs, and an arm is mounted for pivotal motion on the end of each stud, the surfaces of the arm and the plate in engagement being provided with complementary camming surface such that the pivotal motion of the arm under the influence of centrifugal force causes a pull on the end of the stud drawing the two plates toward each other so as to frictionally engage the plates, the annular friction elements and the disc, with the result that the driven shaft is rotated in unison with the driving shaft. The camming surfaces are shaped such as to cause a positive engagement of the clutch for a certain amount of rotational velocity of the driving shaft, the amount of torque transmitted through the clutch coupling being dependent from the initial adjustment of the clutch rather than dependent from the rotational velocity of the driving shaft.

8 Claims, 4 Drawing Figures

Patented April 24, 1973

3,729,078

INVENTORS
JAMES R. KINCAID
CLIFFORD KINCAID
BY Hauke, Gifford & Patalidis
ATTORNEYS

3,729,078

CLUTCH WITH CENTRIFUGALLY OPERATED CAMS

BACKGROUND OF THE INVENTION

The present invention belongs to the field of automatic clutches and more particularly to the field of automatic mechanical clutches engaged by centrifugal force.

Automatic clutches are of common use in some motor vehicles such as passenger cars and motor trucks, motorcycles and the like, and in diverse machines such as for example chain saws and the like. Automatic clutches may be made to be operated by different control means, but one of the conventional ways of operating or controlling automatic clutches is by centrifugal force. Centrifugally operated mechanical clutches may take the form of a drum mounted on a driven shaft cooperating with a plate mounted on the driving shaft provided with shoe elements engageable by centrifugal force with the flange of the drum element. Centrifugal force operated clutches may also take the form of a pair of juxtaposed plates or cones, axially displaceable under the action of centrifugally displaced levers so as to cause frictional engagement of the discs or cones.

In conventional automatic mechanical clutches controlled by centrifugal force, the amount of frictional engagement between the driving and the driven elements is substantially proportional to the rotational velocity of the driving shaft, such that the clutch is capable of transmitting a greater torque at high velocity than at low rotational velocity of the driving shaft. This presents the inconvenience that at low rotational speeds, when it is often desired to transmit a substantially high torque, the frictional engagement of the clutch members is relatively weak, thus causing slippage, heat and wear, and continuous engagement and disengagement of the clutch. The present invention remedies such disadvantage as a result of providing centrifugally actuated means only for positively engaging the frictional elements of the clutch, such that the torque transmitting capability of the clutch is substantially the same at low rotational velocity as at high rotational velocity, because the amount of mutual frictional engagement between the elements of the clutch is only dependent on the initial adjustment of the clutch. Such results are accomplished by the present invention by way of providing camming surfaces on the centrifugally pivoted arms engaging corresponding camming surfaces on one of the clutch plates at the pivotal mount of the arm on the stud interconnecting the clutch plates, the camming surfaces having appropriate convex and concave arcuate contours such that prior to the end of the maximum permissible pivotal motion of the arms a predetermined pull is exerted on the studs, causing the plates to be drawn together, depending on the initial adjustment of the clutch rather than on the amount of centrifugal force causing such pivotal motion of the arms.

In addition, the present invention provides a minimum number of parts in the clutch assembly, most of which can be made of simple form stampings, which leads naturally to low cost and high production rates.

The many objects and advantages of the present invention will become apparent to those skilled in the art when the following description of the best mode contemplated for practicing the invention is read in conjunction with the drawings wherein like reference numerals refer to like parts throughout the several views.

DETAILED DESCRIPTION OF THE PREFERRED EMBODIMENT

Figure 1:
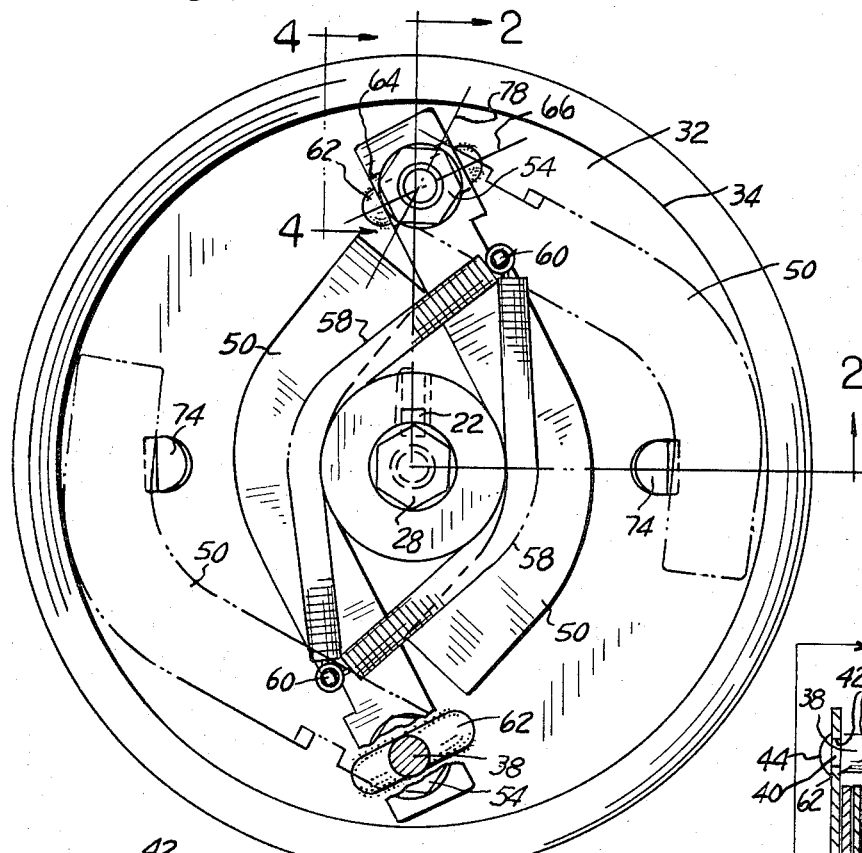
FIG. 1 is a front elevation view of an automatic clutch embodying the present invention.
Figure 2:
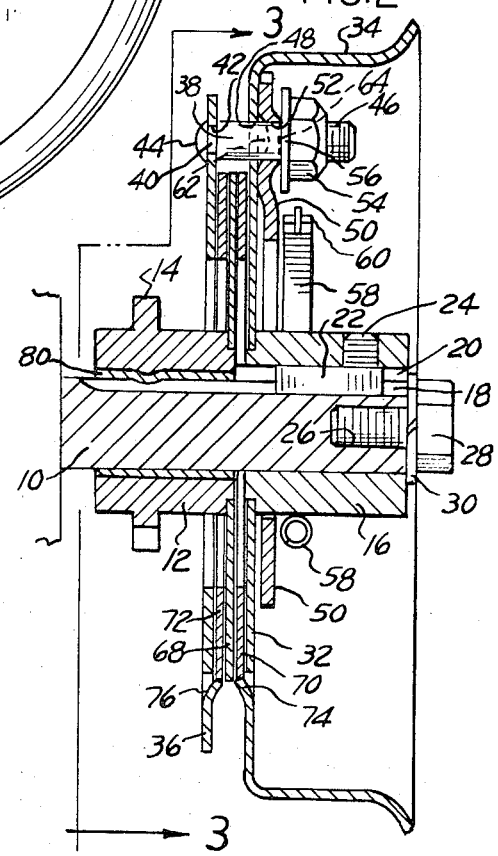
FIG. 2 is a sectional view along line 2—2 of FIG. 1.
Figure 3:
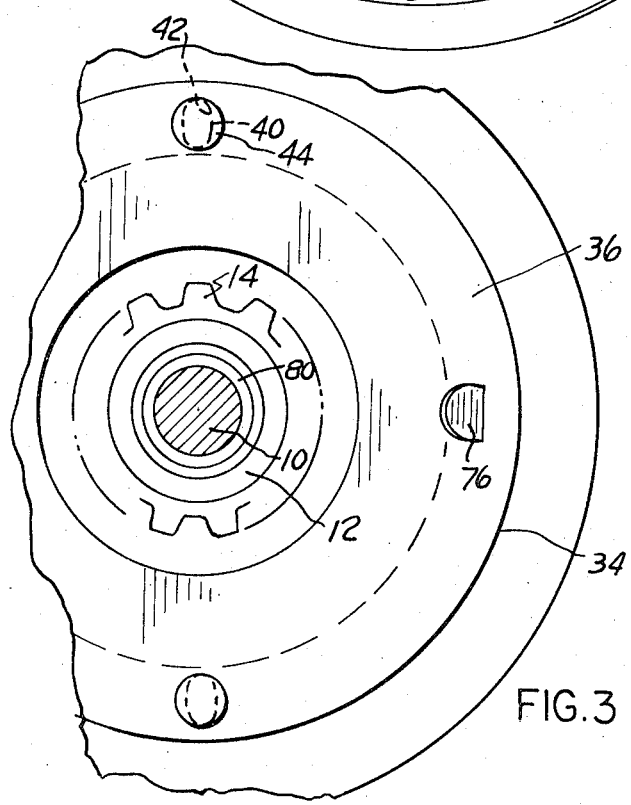
FIG. 3 is a partial elevation view from line 3—3 of FIG. 2.

Referring now to FIGS. 1-3 of the drawings, an example of embodiment of the present invention is illustrated in the form of an automatic mechanical clutch for coupling a driving shaft 10, such as the output shaft of an engine or motor, with a driven shaft shown in the form of a hollow stub shaft 12 provided with a toothed sprocket 14. Such an arrangement is convenient for driving the rear wheel of a small motorcycle, commonly known as a "mini-bike," or for driving the chain of a chain saw, or the like. It is obvious that the toothed sprocket 14 may be replaced by any other driving means such as a flat pulley or a V-belt pulley, or that the clutch of the invention may be used for a straight through drive, the arrangement best seen in FIG. 2 being reversed such that the hollow shaft 12 is mounted on the end of a driven shaft axially aligned with the driving shaft.

A hub 16 is mounted on the driving shaft 10 by any convenient means such as by a keyway 18 formed in the driving shaft 10 and registering with a keyway 20 formed in the hub 16, a key 22 being inserted in the keyways and held in position by means of a set screw 24 radially threaded through the hub. In the example illustrated, the end of the driving shaft 10 is provided with an axial threaded bore 26 in which is threaded the end of a bolt 28, a washer 30 being placed between the head of the bolt and the end of the shaft such that the right end of the hub 16 abuts against the face of the washer 30, thus determining the longitudinal positioning of the hub 16. It is obvious that any appropriate means for mounting the hub 16 on a driving shaft such as shaft 10 can be used instead of the arrangement specifically illustrated.

A radially disposed plate member 32 is mounted on the other end of the hub 16, for example by being welded thereon, the plate member 32 in the example of the invention shown being substantially cup-shaped so as to be provided with an integral longitudinally extending flange portion 34. A second plate member 36, substantially formed as a ring, is supported in spatial arrangement with and substantially parallel to the first plate member by way of a pair of studs 38, one of which is shown only in FIG. 2. Each stud 38 is, as shown, provided with a non-circular reduced diameter portion 40 passing through a correspondingly shaped aperture 42 in the plate member 36, and the end of the material of the stud 38 projecting through the aperture 42 in the plate member 36 is peened or hammered in the form of a flat hemispherical head 44, substantially like a rivet head, such that each stud 38 is rigidly supported from the plate member 36 substantially parallel to the axis of the shaft 10. Each stud 38 has a threaded end 46 projecting through a circular aperture 48 through the wall of the plate member 32. A pair of arms 50, one of which only is shown in FIG. 2, are each pivotally mounted on the stud 38 by means of a circular aperture 52 formed in the end of the arm. The arms 50 are substantially J-shaped and each is held in pivotal assembly on the end of each stud 38 by means of a nut 54, a washer 56 being preferably disposed between the nut and the corresponding surface of the arm. The two arms 50 are normally biased, in a direction that causes the concave curved portion thereof to engage the diametrically opposed sides of the flange 34, by way of a pair of springs 58 having both their ends attached to the arms 50 by means of a pin or bracket 60 formed by an integral partly cut-out and bent over portion of each arm. The plate member 32, at each aperture 48, is provided with a camming surface formed integrally in the plate and substantially shaped as an elongated convex arcuate boss 62, the surface of each arm 50 at the aperture 52 being also provided with a camming surface in the form of a concave elongated arcuate boss 64, the shape of the convex boss 62 and of the concave boss 64 being complementary of each other. In addition to the convex boss 62 on the plate member having an arcuate shape which is complementary of the arcuate shape of the concave boss 64 on the end of the arm 50, it has an axis of elongation arbitrarily shown at 66 in FIG. 1 which coincides with the axis of elongation of the concave boss 64 on the end of the arm 50 when the sides of the arms 50 are caused, under the action of the springs 58, to abut against the sides of the hub 16. The axes of elongation of the convex boss 62 and of the concave boss 64 are substantially perpendicular to the axis of the stud 38.

A disc 68 is mounted on the end of the driven hollow shaft 12 by being, for example, welded thereon, the disc 68 being substantially parallel to the plate members 32 and 36 and disposed therebetween. A pair of annular friction elements 70 and 72 are disposed respectively between one side of the disc 68 and the plate member 32 and the other side of the disc 68 and the plate member 36. The annular friction elements 70 and 72 may be bonded either to the surface of the plate members or to the disc surface, but preferably and as shown they are loosely held in radial position by means of a pair of partly cut-out and bent over tabs 75 integral with the plate member 32 diametrically disposed relatively to the annular friction element 70, and a pair of similarly bent over tabs 76 integral with the plate member 36 diametrically disposed relatively to the annular friction element 72. In this manner, by means of the diametrically opposing tabs causing radial interference, the frictional annular members 70 and 72 are radially maintained in an appropriate position while allowed to be freely displaceable longitudinally or axially of a small amount. It is obvious that more than two tabs may be provided, such as for example three or more radially equally spaced about the axis of rotation of the clutch coupling.

Figure 4:
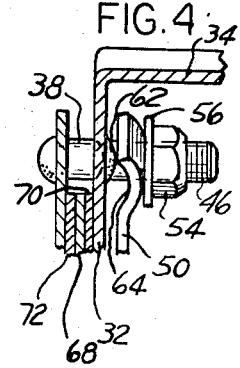
FIG. 4 is a partial sectional view from line 4—4 of FIG. 1 showing the relative arrangement of the elements of the clutch of the invention causing engagement of the clutch friction surfaces.

As long as the driving shaft 10 and the hub 16 are stationary or rotate at a rotational velocity below a predetermined velocity, the arms 50 are in the position shown in full lines in FIG. 1, biased in this position by the return coil springs 58, and the plate members 32 and 36 are separated from each other by enough a distance to loosely accommodate the superimposed thicknesses of the annular friction elements 70 and 72 and of the disc 68, without frictional engagement with one another. However, as soon as the driving shaft 10 and the hub 16 are caused to rotate at a rotational velocity above such predetermined speed depending on the strength of the springs 58 and the weight of the ends of the arms 50, the arms 50 are displaced pivotally relatively to the studs 38 to the position shown in phantom line in FIG. 1, with the result that the pivoting of the arms causes the engagement between the convex arcuate boss 62 in the plate member 32 and the concave arcuate boss 64 on the end of each arms 50 to lift the pivot plane of the arm away from the plate member 32. As one side of the arms 50 abuts against the washer 56, the interreaction between the convex surface of the arcuate boss 62 on the plate member 32 and the concave surface of the arcuate boss 64 on the end of the arms 50 causes a pull to be exerted on the end of the studs 38 causing in turn the plate member 36 to be drawn toward the plate member 32. Because the axis of elongation 78 (FIG. 1) of the concave arcuate boss 64 on the arm 50 no longer coincides with the axis of elongation 66 of the convex arcuate boss 62 on the plate member 32, the edge of the concave arcuate boss 64 on the end of the arm 50 is caused to ride over the most elevated portion of the convex arcuate boss 62 on the plate member 32 as shown at FIG. 4. The maximum pivotal motion of the arms 50 is limited to the arms abutting against the interior surface of the integral flange 34 of the plate member 32, as shown in phantom lines in FIG. 1. It is obvious that in that position of the arms 50 the plate member 36 is drawn toward the plate member 32 by the pull, resulting from the rotation of the arms 50, which is exerted on the end of the studs 38. The opposite surfaces of the disc 68 are caused to frictionally engage the corresponding surfaces of the frictional annular elements 70 and 72 which are in turn frictionally engaged with the surface of the plate members 32 and 36 respectively, such that the disc 68 is caused to rotate in unison therewith, therefore causing in turn rotation of the hollow shaft 12. In the arrangement illustrated in order to improve the bearing surfaces between the inner surface of the hollow shaft 12 and the peripheral surface of the driving shaft 10 an appropriate bearing bushing 80 is fitted between the periphery of the driving shaft 10 and the interior of the hollow shaft 12.

The interference between the convex arcuate surface of the boss 62 on the plate member 32 and the concave arcuate surface of the boss 64 on the end of the arm 50 provides a camming action which is non-linear as a function of the amount of pivotal motion of the arms 50. When, under the action of centrifugal force, the arms 50 are displaced from the position shown in full lines in FIG. 1, a given pivotal motion of the arms results in a substantially great amount of displacement to the right, as seen in FIGS. 2 and 4, of the studs 38, and such displacement becomes progressively less as a function of a same amount of pivotal motion of the arms 50 as the arms 50 get closer to a position where they abut against the interior surface of the flange 34, as shown in phantom lines in FIG. 1. This results consequently in a substantially rapid engagement of the clutch and, when the ends of the arms 50 become further spread apart due to a slight increase of the centrifugal force caused by a slight increase of rotational velocity of the driving shaft 10, this slight increase of centrifugal force is amplified considerably to provide a strong pull on the studs 38 as a result of the camming surfaces of the bosses in engagement with each other being engaged along an imaginary tangent which is tending progressively to become substantially right angled with the axis of the studs 38, such that towards the end of the permissible pivotal motion of the arms 50 very little displacement of the studs 38 to the right, as seen in FIGS. 2 and 4 of the drawings, is caused to occur, while the force exerted on the studs and tending to draw the plate member 36 toward the plate member 32 becomes relatively much greater.

The nuts 54, which are preferably of the frictional or lock nut type, provides a convenient means for adjusting the maximum pressure exerted by the plate members 32 and 36 on the surfaces of the disc 68, through the intermediary annular friction elements 70 and 72. In this manner, the torque transmission ability of the clutch of the invention is simply determined by the adjustment provided by the nuts 54 as threaded on the end 46 of the studs 38, by the areas of the surfaces in engagement with each other, and by the frictional ability or coefficients of friction of the engaged surfaces, and the torque transmission ability of the clutch is not dependent upon the amount of centrifugal force causing the arms 50 to be spread apart, as a correct adjustment of the clutch system of the invention provides for the ends of the arms 80 abutting against the interior of the flange 34 during normal operation of the clutch at a predetermined rotational velocity.

As soon as the rotational velocity of the clutch coupling between the drive shaft 10 and the driven shaft 12 falls below a predetermined velocity, the return springs 58 pivot the arms 50 to the position shown at FIG. 2 and in full line in FIG. 1. It is obvious that this in turn causes a slight spreading apart of the plate member 36 relatively to the plate member 32, with the result that the surfaces of the plate members, of the annular friction elements 70 and 72 and of the disc 68 are no longer engaged with each other. A return spring, such as a coil spring disposed around each of the studs 38 between the plate members 36 and 32 may be provided, but it has been found that such return spring is not necessary, and that if return springs are omitted, a smoother functioning of the clutch and an improved sensitivity of the centrifugal force actuated arms result.

The diverse elements forming the clutch assembly of the invention, such as the disc 68, the plate members 32 and 36 and the arms 50, are preferably made of heavy stock stampings which greatly facilitate forming of the mating concave and convex arcuate camming bosses 62 and 64 respectively on the plate member 32 and at the ends of the arms 50, resulting in a simplified construction and in lower manufacturing costs.

It is obvious that more than two studs and arms may be provided, such stud and arm assemblies being radially regularly disposed about the axis of rotation of the clutch coupling.

Having thus described the invention by way of an example of embodiment given for illustrative purposes only, what is claimed as new is as follows:

1. An automatic clutch for driving a driven shaft from a driving shaft above a predetermined rotational velocity of said driving shaft, said automatic clutch comprising a first plate member mounted on said driving shaft for rotation in unison therewith, at least a pair of diametrically opposed studs longitudinally extending from said first plate member, a second plate member coaxially aligned with said first plate member and supported on said studs in spatial arrangement with said first plate member, a disc substantially parallel to said plate members and mounted on said driven shaft between said first and second plate members, a pair of annular friction elements each loosely disposed between one side of said disc and one of said plate members, at least a pair of centrifugally swingable arms each having an end pivotally mounted on one of said studs, a camming surface formed on said end of each of said arms for engagement with a corresponding camming surface formed on one of said plate members whereby pivotal motion of said arms under the influence of centrifugal force at said predetermined rotational velocity causes a pull on said studs drawing said plate members closer to one another for frictionally engaging said plate members, annular friction elements and disc together, and spring biasing means for causing pivotal motion of said arms in an opposite direction below said predetermined rotational velocity for disengaging said plate members, said annular friction elements and said disc, wherein said camming surface formed on said plate member is an elongated convex arcuate boss normally projecting into a corresponding elongated concave arcuate boss formed on the end of said arm, the axes of elongation of said convex and concave bosses being substantially parallel when said arms are in a position causing disengagement of said plate members, said annular friction elements and said disc.

2. The automatic clutch of claim 1 further comprising abutment means limiting the pivotal motion of said arms under the influence of centrifugal force.

3. The automatic clutch of claim 1 wherein each of said studs is threaded at an end thereof, said end pivotally supporting said arm and further comprising a nut threadably engaged on said stud end for adjustment of the distance separating said plate members.

4. The automatic clutch of claim 1 wherein each of said annular friction elements is radially held in position by means of at least a pair of diametrically disposed integral tabs axially projecting from each of said plate members.

5. The automatic clutch of claim 1 wherein said abutment means consists of a flange formed integrally at the peripheral edge of one of said plate members.

6. The automatic clutch of claim 1 wherein said spring biasing means comprises coil springs each having an end attached to one of said arms and another end attached to the other of said arms, said springs being disposed symmetrically relatively to said driving shaft.

7. The automatic clutch of claim 1 wherein said arms are substantially J-shaped heavy stock stampings, said concave boss being formed integral therewith.

8. The automatic clutch of claim 7 wherein Said plate members are heavy stock stampings and said convex boss is formed integral therewith.

* * * * *